United States Patent [19]

Casanova

[11] Patent Number: 4,639,629
[45] Date of Patent: Jan. 27, 1987

[54] BRUSH-HOLDER FOR FLAT-COMMUTATOR ELECTROMECHANICAL TRANSDUCER

[75] Inventor: Damien Casanova, Barcelona, Spain

[73] Assignee: Mavilor Systemes S.A., Switzerland

[21] Appl. No.: 689,821

[22] Filed: Jan. 9, 1985

[30] Foreign Application Priority Data

Jan. 13, 1984 [FR] France ............................... 84 00512

[51] Int. Cl.$^4$ ............................................. H02K 13/00
[52] U.S. Cl. .................................... 310/248; 310/247; 310/268; 310/237
[58] Field of Search ................................ 310/239–242, 310/245, 247, 248, 251, 268, 237

[56] References Cited

U.S. PATENT DOCUMENTS

| 3,144,574 | 8/1964 | Baudot | 310/237 |
| 3,525,008 | 8/1970 | Burr | 310/237 |

FOREIGN PATENT DOCUMENTS

| 130228 | 6/1901 | Fed. Rep. of Germany | 310/248 |
| 2316796 | 10/1974 | Fed. Rep. of Germany | 310/248 |
| 2843374 | 4/1980 | Fed. Rep. of Germany | 310/237 |
| 14124 | of 1893 | United Kingdom | 310/248 |
| 0582546 | 11/1977 | U.S.S.R. | 310/247 |

Primary Examiner—Mark O. Budd
Attorney, Agent, or Firm—Kane, Dalsimer, Kane, Sullivan and Kurucz

[57] ABSTRACT

The present invention relates to a brush-holder for flat-commutator electromechanical transducer.

The brush secured by screws (11) to the flange (2) of the transducer consisting in this case of a motor having a flat rotor (5) comprises a supporting ring (12) and guide sockets (13). The sockets (13) and the brushes (14) have the shape of a circular arc segment. The socket end opposite the end facing the commutator (6) is closed by a cover (16) screwed in the socket (13). The cover (18) is attached to a coil spring (19) secured in turn to the brush (14). Access to the end of a socket (13) closed by the cover (18) can be had by removing a plug (17) of the stator cage (16) of a device coupled to the motor. The shape of the sockets (13) permits on the one hand the replacement or adjustment of the brushes (14) without disassembling the stator cage (16) and on the other hand of preventing the pivotal movement of the brushes within the sockets (13) and the wear of their ends to a "screwdriver" configuration especially when the motor is operated with frequent changes in its direction of rotation, for example when it is used as a servo motor.

8 Claims, 2 Drawing Figures

BRUSH-HOLDER FOR FLAT-COMMUTATOR ELECTROMECHANICAL TRANSDUCER

The present invention relates to a brush-holder for a flat-commutator electromechanical transducer, comprising guide sockets.

Motors having a disc-shaped rotor which stand out by virtue of their extremely reduced volume due essentially to the flat configuration of their rotor are already known. The commutator of these motors is either cylindrical or flat or plane (see review KONSTRUKTION & DESIGN No. 5/1978, pages 31 and 32). In the case of flat commutator, the latter is secured to one of the side faces of the rotor, so that the longitudinal dimension of the motor can be further reduced. Of course, flat commutators are also used with long-rotor motors also permitting of reducing the longitudinal dimension of the motor. In this case the brush-holder consists generally of a ring secured to one of the stator flange and of prismatic guide sockets rigid with the ring and disposed parallel to the motor shaft.

This form and arrangement of the sockets are attended by two major inconveniences. Firstly, the length of the guide sockets and therefore of the brushes housed therein is limited by the minimum overall dimensions requirements prescribed for on the one hand the axial distance between the commutator and the stator flange, supporting the brush-holder ring, is relatively reduced and on the other hand it is not possible to allow the sockets to protrude from the stator beyond a certain limit. This limit is subordinate to the desired total length of the motor and of the device or devices attached thereto, for example a tachometric generator, a pulse generator, etc. Secondly, on account of the relatively small length of the brushes their replacement is more frequent, thus requiring the dismantling of the attached devices in order to gain access to the ends of the guide sockets which project externally of the motor stator for replacing the brushes or possibly adjusting their pressure. Obviously, the consequence of this dismantling is attended by a considerable loss of time due to the motor hold-up and the intervention of the operator entrusted with the replacement or adjustment of the brushes.

There is a third inconvenience due to the relatively reduced length of the brush, since the brush must be able to slide within the guide socket, a play exists between the brush and the inner walls of the socket. When the rotor of the transducer rotates in one direction, the free end of the brush which is in frictional contact with the commutator tends to move in the direction of rotation along the tangent to the friction point. Due to the aforementioned play the brush is moved slightly in the socket by pivoting about the point lying on its longitudinal axis so that its longitudinal axis while remaining in a plane perpendicular to the commutator plane is no more perpendicular to the commutator but slightly inclined thereto. This pivotal movement is due to the resultant of two forces exerted on the brush, namely on the one hand the force of the spring constantly urging the brush against the commutator, this force being directed at right angles to the commutator plane, and on the other hand the force resulting from the frictional contact between the commutator and the brush, this force being directed at right angles to the preceding one and in the direction of rotation of the commutator. The resultant of these two forces is a force directed obliquely in relation to the friction face of the brush and causing the brush to pivot about a point lying on its longitudinal axis. The consequence of this position is on the one hand that since the face of the brush end in frictional contact with the commutator is oblique in relation to the brush axis, and on the other hand that as the brush length decreases due to its wear, the angle of inclination of the brush axis increases and the brush tends to jam and to be stuck in the socket under the spring pressure. Thus, this oblique position of the brush on the one hand is liable to interfere with the proper operation of the transducer if the brush is not contacting permanently the commutator, and on the other hand if the direction of rotation of the rotor and therefore of the commutator is changed then the brush axis inclination will also be changed. In this case the oblique face at the operative end of the brush is no more parallel but inclined to the commutator face and the contact between the brush and the commutator takes place through an edge, which is not sufficient for a proper operation of the transducer. It is only when a new face is formed by wear that the contact resumes its full efficiency. Obviously, this problem is aggravated in the case of a servo motor of which the direction of rotation changes continuously for in this case the brush end is cut to a screwdriver-tip configuration whereby the proper contact between the brush and the commutator will never be restored again.

A known proposition for avoiding these inconveniences consists in disposing the prismatic guide sockets obliquely in relation to the commutator face, but the results are far from satisfactory because under these conditions the brush is subjected to torsion stresses.

It is the object of the present invention firstly to facilitate the access to the guide sockets in case of replacement or adjustment of the brushes of an electromechanical transducer without disassembling the devices coupled thereto, and secondly to permit of increasing the brush length without increasing the longitudinal dimension of the trasducer and, of course, of the final assembly obtained by combining the various other devices assembled therewith, and also to reduce the inconveniences deriving from the transverse shifting of the brush by pivoting about a point located on the longitudinal axis within the socket.

The brush-holder according to the invention is characterized by the fact that the guide sockets are curved for receiving curved brushes so disposed that their first ends register with the commutator on a virtual circle concentric to the transducer shaft whereas the other ends diverge from this shaft and lie on a second virtual circle concentric to said shaft and of a radius greater than that of said first circle.

The advantages deriving from the invention consist of the configuration of the guide sockets and also of their arrangement. In fact, the curved shape of the sockets permits on the one hand of increasing the brush length and thus avoiding the inconveniences characterizing short brushes and on the other hand of disposing said brushes in such a way that their free ends are accessible and permit the replacement or the adjustment of the brushes without having to disassemble the other devices mounted on the transducer flange. In this case either the ends of the guide sockets are directly accessible because they extend through the case of the device following the transducer flange supporting the brush holder, or they are disposed inside said case and thus it is only necessary to remove one screw or a plug for providing access thereto. The consequence of the curved shape of a guide socket and of the brush is that under the resilient thrust exerted by the spring against the free end of the brush, this brush is constantly pressed against the inner wall of the inner face (on the motor shaft side) of the socket. Moreover, as a result of the frictional contact between the brush and the commutator, the brush is pressed against one of the lateral faces of the socket. The combination of these two effects prevents the pivotal movement of the brush and therefore the bevelling of the brush face contacting said commutator and the screwdriver cutting of this face with a torque at least equal to that of the spring force plus the frictional effort exerted by the brush on the guide. In other words, if one observes the friction face, one sees that it is subjected to a component of the spring force which is perpendicular to the inner face (on the motor shaft side) of the socket and of a force directed at right angles to the preceding one and resulting from the frictional contact between the brush and the commutator. The component of these two forces located in the plane of the friction face is a force located in the same plane and tending to urge the brush against the inner face and a lateral face of the socket, thus preventing the pivotal movement. On the other hand and in addition the pivot center is no more on the median line of the brush but on the side of the center of curvature, thus reducing the pivotal torque. The effect of the component of the spring force, perpendicularly to the commutator plane, is reduced on account of the curved shape of the socket and of the brush, whereas in the case of a rectilinear socket the spring force is exerted only substantially at right angles to the commutator.

In a modified form of embodiment, the guide sockets have a circular arc configuration.

According to another modified form of embodiment, the brush-holder consists of a ring supporting the guide sockets which is mounted on a flange of the transducer.

According to a preferred form of embodiment, the transducer is a motor having a disc-shaped rotor, preferably a d.c. motor to which a tachometric generator or a pulse generator or other generator is added.

The invention will now be described more in detail with reference to the attached drawing illustrating a specific form of embodiment of the invention.

Figure 1:
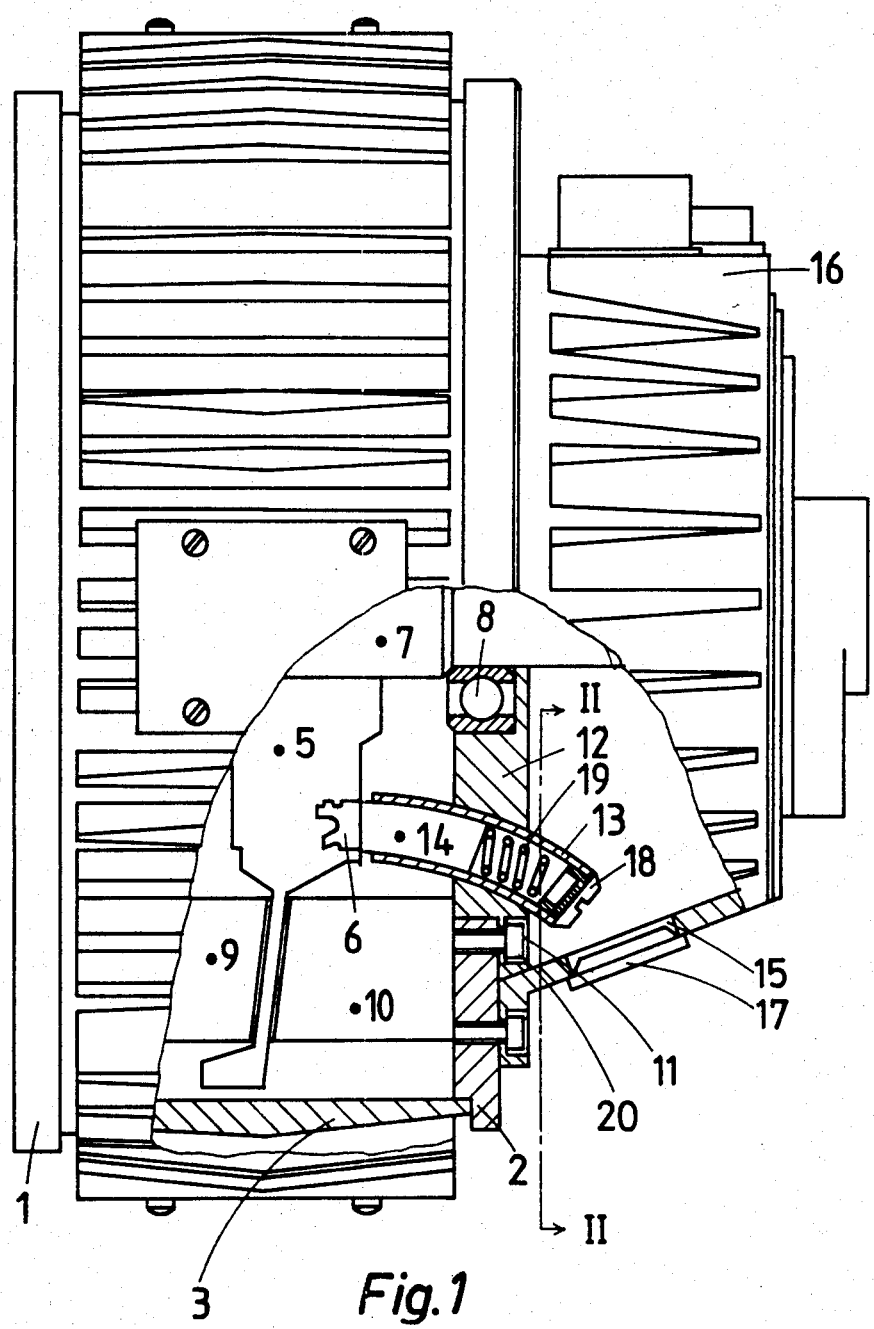
FIG. 1 is a plane view of a transducer with a fragmentary section to show the brush-holder according to the invetion.

The electromechanical transducer illustrated in FIG. 1 is a d.c. motor having a disc-shaped rotor and permanent magnets.

The stator section of the motor comprises two flanges 1, 2 and an annular case 3 provided with cooling fins.

Figure 2:
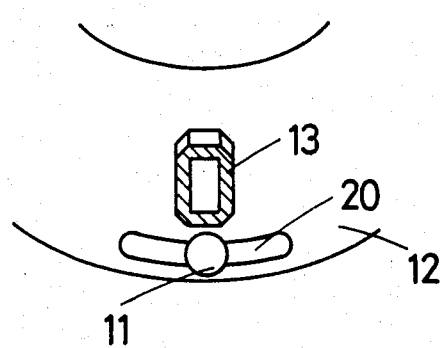
FIG. 2 is a fragmentary section taken along the line II—II of FIG. 1.

The rotor 5 of the motor is a wire-wound, disc-shaped rotor of molded synthetic resin and comprises a flat commutator 6 incorporating a multiplicity of strips. The rotor 5 is rigid with the motor shaft 7 mounted through ball-bearings 8 to the stator flanges 1, 2. These flanges 1, 2 are provided with permanent magnets 9 respectively 10, disposed in axial alignment. Secured to the motor flange 2 by means of screws 11 is the brush-holder consisting of a supporting ring 12 and of guide sockets 13 for the brushes 14. The screws 11 engage the flange 2 through apertures 20 of annular segment configuration formed in the supporting ring 12. These apertures 20, when the screws 11 are released, permit of rotating the ring 12 and thus changing the commutation angle. The brushes 14 are provided with coil compression springs 19 constantly urging the brushes against the commutator 6. The ring 12 and socket 13 are made of insulating material such as plastic. The guide sockets 13 have a circular arc configuration and have a rectangular cross-section (FIG. 2).

The ends of the sockets which protrude from the stator cage of the motor register with apertures 15 formed in the cage 16 of the auxiliary device coupled to the motor, which may consist for example of a tachometric generator or a pulse generator permitting of determining the angular position of the rotor, said apertures being closed by plugs 17. By removing the plugs 17 one can have access to the end of the socket 13 which is closed by a cover 18 screwed in the socket 13 and attached to the spring 19 to permit on the one hand the adjustment of the bearing pressure of brush 14 against the commutator 6 and on the other hand of removing the worn brushes by removing the cover 18. To permit the screwing of the cover 18 in the socket the end 14 of each socket 13 is provided with thread segments inside its edges. The sockets 13 are mounted in the supporting ring 12.

It is obvious that it is also possible to use longer sockets 13 extending through the apertures 15 of cage 16.

Between the brushes 14 which are also curved and the guide sockets a small play is provided, for example 0.2 mm, to permit the sliding movements of the brushes, but the shape and length of the brushes prevent the brushes from jamming by rolling on the edge.

I claim:

1. Brush holder for an electromechanical transducer provided with a flat commutator, comprising guide sockets, characterized by the fact that the guide sockets are curved for receiving curved brushes and so disposed that their first ends register with the commutator and on a virtual circle concentric to the transducer shaft, whereas the second ends remote from said shaft lie on a second virtual circle concentric to said shaft and of radius greater than that of the virtual circle.

2. The brush-holder of claim 1, characterized by the fact that the guide sockets and the brushes have the shape of circular arcs.

3. The brush-holder of claim 1, characterized by the fact that the guide sockets are rigid with a supporting ring concentric to the transducer shaft.

4. The brush-holder of claim 1, characterized by the fact that the transducer is a transducer having a disc-shaped rotor and that the commutator is an integral portion of one of the side faces of the rotor.

5. The brush holder of claim 1 having removable covers at the remote ends of the guide sockets for ease of access to the end of brushes 13.

6. The brush holder of claim 5 characterized by the fact that the apertures in the cage of the auxiliary device are closed by removable plugs for ease of access to the guide sockets.

7. The brush holder of claim 6 wherein the removable covers are threadingly engaged to the remote ends of the guide sockets, each spring including a brush and a guide socket disposed therein, the removable covers permitting adjustment of pressure of the brushes against the commutator.

8. The brush holder of claim 1 wherein the guide sockets extend through the apertures in the cage of the auxiliary device.

* * * * *